United States Patent
Miyazaki

(10) Patent No.: US 7,499,085 B2
(45) Date of Patent: Mar. 3, 2009

(54) INFORMATION TERMINAL WITH CONTROLLER FOR STOPPING VOICE DATA

(75) Inventor: Tomiya Miyazaki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 10/462,192

(22) Filed: Jun. 16, 2003

(65) Prior Publication Data
US 2004/0017927 A1 Jan. 29, 2004

(30) Foreign Application Priority Data
Jun. 17, 2002 (JP) ............... 2002-175461

(51) Int. Cl.
H04N 5/225 (2006.01)
H04N 7/14 (2006.01)
H04N 5/76 (2006.01)
H04N 7/26 (2006.01)

(52) U.S. Cl. ............ 348/231.4; 348/14.12; 348/207.11; 386/107

(58) Field of Classification Search ............ 348/207.11, 348/14.12, 14.05, 207.1, 211.99, 211.8, 211.11, 348/211.12, 211.13, 211.14, 231.4; 386/38, 386/39, 96, 98, 100, 107
See application file for complete search history.

(56) References Cited

U.S. PATENT DOCUMENTS

| | | | | |
|---|---|---|---|---|
| 4,755,885 A | * | 7/1988 | Okino et al. ................ | 386/107 |
| 4,937,673 A | * | 6/1990 | Saito et al. .................. | 348/64 |
| 5,898,459 A | * | 4/1999 | Smith et al. ................ | 348/219.1 |
| 6,529,234 B2 | * | 3/2003 | Urisaka et al. ............ | 348/211.99 |
| 6,594,443 B1 | * | 7/2003 | Yamagishi ................. | 386/107 |
| 7,298,398 B2 | * | 11/2007 | Teramoto et al. .......... | 348/208.99 |
| 2002/0080241 A1 | * | 6/2002 | Paritsky et al. ............ | 348/207 |
| 2004/0032509 A1 | * | 2/2004 | Owens et al. .............. | 348/231.4 |

FOREIGN PATENT DOCUMENTS

| | | | |
|---|---|---|---|
| EP | 0 836 324 A2 | | 4/1998 |
| JP | 03254578 A | * | 11/1991 |
| JP | 06062289 A | * | 3/1994 |
| JP | 07-067013 | | 3/1995 |
| JP | 07-170292 | | 7/1995 |
| JP | 07-226874 | | 8/1995 |
| JP | 09065309 A | * | 3/1997 |
| JP | 2999-510622 T | | 11/1997 |
| JP | 10-285569 | | 10/1998 |

(Continued)

OTHER PUBLICATIONS

JP Office Action 2002-175461.

*Primary Examiner*—John M Villecco
(74) *Attorney, Agent, or Firm*—Pearne & Gordon LLP

(57) ABSTRACT

An information terminal is arranged by employing an image input apparatus, a voice input apparatus, an information communication apparatus, and a controller for outputting both image information and voice information to the information communication apparatus. The information terminal is operated in such a manner that while an image entered from a camera is synchronized with voice entered from a microphone, these image and voice data is sent out to a network. When the camera is panned, tilted, or moved, the controller ceases a process operation with respect to voice data in response to this camera move signal. As a result, noise which is generated by moving the camera cannot be mixed into transmission data.

4 Claims, 6 Drawing Sheets

FOREIGN PATENT DOCUMENTS

| | | | | |
|---|---|---|---|---|
| JP | 2001111883 A | * | 4/2001 | |
| JP | 2004120147 A | * | 4/2004 | |
| JP | 2005253010 A | * | 9/2005 | |
| JP | 2006203376 A | * | 8/2006 | |
| WO | WO 00/21258 | | 4/2000 | |
| WO | WO01/82626 A1 | | 11/2001 | |

* cited by examiner

INFORMATION TERMINAL WITH CONTROLLER FOR STOPPING VOICE DATA

BACKGROUND OF THE INVENTION

1. Field of the Invention

The present invention is related to an information terminal and an information communication system, capable of acquiring/distributing information via information lines.

2. Description of the Related Art

Recently, information communication systems capable of simultaneously communicating both images and voice via the Internet have been gradually utilized. FIG. 6 is a schematic block diagram for showing a conventional image terminal and a conventional information communication system. In FIG. 6, reference numeral 200 shows an image terminal, reference numeral 201 indicates a power supply circuit for supplying electric power to the image terminal 200, and reference numeral 202 indicates a controller for controlling the image terminal 200.

Reference numeral 203 represents an image input apparatus corresponding to, for example, a camera used to input an image. Reference numeral 204 shows an image controller. This image controller 204 can change a position (for instance, either enlarging or compressing operations, and either lateral/longitudinal or right/left directions of movement) of a camera of the above-explained image input apparatus 203. Reference numeral 205 shows a wire communication apparatus which is connected to a LAN (for instance, Ethernet (registered trademark)) and corresponds to an interface capable of communicating information inputted into this wire communication apparatus 205. Reference numeral 206 shows a communication cable. Reference numeral 220 indicates a gateway which transmits/receives data of the image terminal 200 via the communication cable 206 with respect to the wire communication apparatus 205.

Also, reference numeral 221 represents an information terminal-"a." This information terminal-"a" 221 is connected to the gateway 220 by way of a network so as to transmit/receive data. Reference numeral 222 denotes an Internet connection network. Reference numeral 223 shows an information terminal-"b." This information terminal-"b" 223 is connected via the Internet connection network 222 to the gateway 220 so as to transmit/receive data.

Referring now to FIG. 6, operations of the conventional image terminal and the conventional information communication system will be described. That is, image information and the like captured by a camera and the like is acquired by the image input apparatus 203, and then, this acquired image information of the image input apparatus 203 is connected via the controller 202, the wire communication apparatus 205, and the communication cable 206 to the gateway 220. Also, the information is received by the information terminal-"a" 221 connected to the gateway 220, so that the image information and the like can be displayed on this information terminal-"a" 221. Then, in such a case that both a direction and a dimension (size) of the image information is changed in the information terminal-"a" 221, setting position information corresponding to these changed direction/size is received via the gateway 220 by the wire communication apparatus 205, and thus, desirable image information may be obtained by driving the image controller 204 via the controller 202.

Also, when information supplied from an external source is acquired and set, image information and the like captured by the camera and the like is acquired by the image input apparatus 203, and then, this acquired image information of the image input apparatus 203 is connected via the controller 202, the wire communication apparatus 205, and the communication cable 206 to the gateway 220. Also, the information is received by the information terminal-"b" 223 connected to the gateway 220 via the Internet connection network 222, so that the image information and the like can be displayed on this information terminal-"b" 223. Then, in such a case that both a direction and a dimension (size) of the image information is changed in the information terminal-"b" 223, setting position information corresponding to these changed direction/size is received via the Internet connection network 222 and the gateway 220 by the wire communication apparatus 205, and thus, desirable image information may be obtained by driving the image controller 204 via the controller 202.

However, the conventional image terminal constructed of the monitor camera corresponds to such a system for transmitting information made of only image information. This image terminal may become advantage as a monitor use. Nevertheless, image terminals capable of providing information services to which voice information has been added have been desired.

SUMMARY OF THE INVENTION

The present invention has been made to solve the above-described conventional problem, and therefore, has an object to provide both an information terminal and an information communication system, capable of not transmitting noise which is produced by changing a direction of a camera, or by moving the own information terminal.

To achieve this object, a voice-added information terminal of the present invention is featured by such an information terminal comprised of an image input apparatus for inputting image information and the like, and a voice input apparatus for inputting voice. The present invention is to provide such an information communication system that in the voice-added information terminal, both image information and voice information can be acquired along a desirable direction, or at a desirable position by operating an image controller for controlling a camera direction, and also, by operating a transporting apparatus for transporting an apparatus itself. In the case that either the image controller or the transporting apparatus is operated, since the operation of the voice input apparatus is stopped, unpleasant noise information is not transmitted, so that noiseless information can be acquired.

DESCRIPTION OF THE PREFERRED EMBODIMENTS

Referring now to FIG. 1 to FIG. 5, various embodiments of the present invention will be described.

First Embodiment

Figure 1:
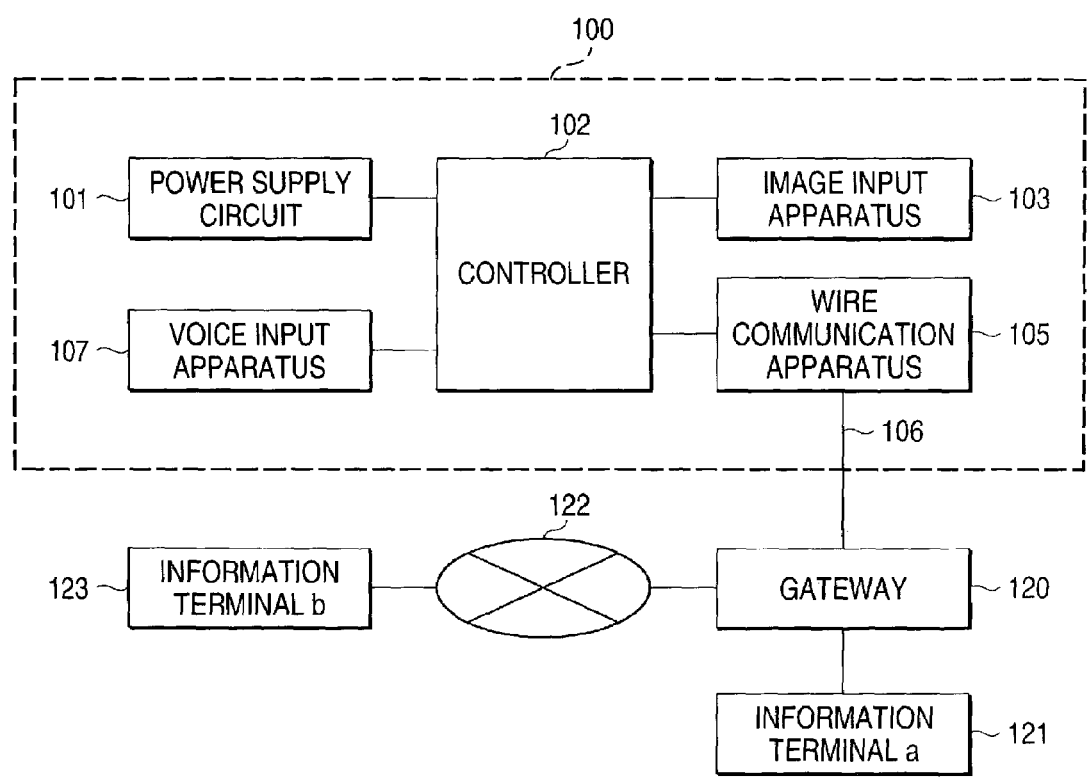
FIG. 1 is a block diagram for schematically showing a voice-added information terminal and an information terminal system according to a first embodiment of the present invention.

FIG. 1 is a block diagram for schematically showing a voice-added information terminal and an information terminal system according to a first embodiment of the present invention. In FIG. 1, reference numeral 100 shows a voice-added information terminal. The voice-added information terminal 100 is equipped with a power supply circuit 101, a controller 102, an image input apparatus 103, a wire communication apparatus 105, and a voice input apparatus 107. The power supply circuit 101 supplies electric power to the respective units employed in this voice-added terminal 100. The controller 102 controls these units of the voice-added terminal 100.

The image input apparatus 103 is equipped with a camera having, for instance, an imaging element such as a CCD, and is further provided with a function capable of converting an image signal entered in this image input apparatus 103 into digital data, and of compressing this converted digital data. In the case that an image signal is inputted, the image input apparatus 103 captures image information of the inputted image by using this camera, and then, compresses this captured image information to produce, for example, JPEG-formatted digital picture data, or MPEG-formatted digital picture data. Also, this image input apparatus 103 selects resolution in response to required resolution (for example, 640×480, 320×240, 160×120 etc.) of an image, and then, performs an image signal compressing operation based upon the selected resolution.

The wire communication apparatus 105 is an interface used to communicate inputted information, and is connected to a LAN (for example, Ethernet (registered trademark)). Reference numeral 106 is a communication cable.

The voice input apparatus 107 acquires an analog voice signal by using a microphone, or the like, and converts this acquired analog voice signal into digital voice data by way of the G. 721, G. 723, G. 726, G. 728, G. 729 systems corresponding to the voice compression system. Reference numeral 120 shows a gateway which transmits/receives both image information and voice information via the wire communication apparatus 105 and the communication cable 106.

Reference numeral 121 represents other information terminal-"a" which is connected to the voice-added information terminal 100 related to the present invention by way of a LAN. The information terminal-"a" 121 is network-connected to the gateway 120, and is capable of transmitting/receiving data with respect to the voice-added information terminal 100. Reference numeral 122 shows an Internet connection network. Reference numeral 123 indicates an external information terminal-"b." This external information terminal-"b" 123 is connected via the Internet connection network 122 to the gateway 120 so as to transmit/receive data.

Referring now to FIG. 1, operations of this voice-added information terminal 100 and the information terminal system will be explained. In the image input apparatus 103, image information and the like are acquired by the camera and the like, the acquired analog picture (image) signal is compressed into digital picture data based upon requirements of, for example, the JPEG format and the resolution of 640× 480, and then, the compressed digital picture data is transmitted to the controller 102 in the data transmission rate of 7.5 fps. Symbol "fps" is an abbreviation of frame per second, and implies a display time of moving pictures, or slide pictures per 1 second.

Also in the voice input apparatus 107, analog voice information is acquired by the microphone and the like, this acquired analog voice information is compressed by using, for example, the voice compressing system of G. 726 so as to produce compressed digital voice data, and then, this compressed digital voice data is transmitted to the controller 102 in the data transmission rate of 32 Kbps (kilobits per second). In the controller 102, both the digital picture data transmitted from the picture input apparatus 103 and the digital voice data transmitted from the voice input apparatus 107 are obtained, and the digital picture data is multiplexed with the digital voice data, and then, the multiplexed data is sent to the wire communication apparatus 105. The multiplexed data transmitted from the wire communication apparatus 105 is received via the communication cable 106 and the gateway 120 by the information terminal-"a" 121, so that images can be displayed on a display device (not shown) thereof and voice can be reproduced by a speaker (not shown) thereof. Similarly, the multiplexed data is received via the gateway 120 and the Internet connection network 122 by the external information terminal-"b" 123, so that images can be displayed on a display device (not shown) thereof and voice can be reproduced by a speaker (not shown) thereof.

At this time, a transmission sequence of voice data and image data is selectively determined in accordance with resolution of the image data, a voice compression system of the voice data, a communication condition of a communication line network, and also a communication speed of this communication line network. In other words, when there is such a trend that voice is delayed with respect to an image, depending upon the present condition, a transmission order of the voice data is increased as compared with that of the image data. Conversely, when there is such a trend that an image is delayed with respect to voice, depending upon the present condition, a transmission order of the image data is increased as compared with that of the voice data. As previously explained, since the transmission sequence of the voice data and the image data is adjusted, the image and the voice can be synchronized with each other.

It should be understood that the LAN interface with respect to the voice-added information terminal 100, the gateway 120, and the information terminal-"a" 121 is not limited as the physical layer only to the Ethernet, a telephone line, an optical fiber, a coaxial cable, and a power line, but may be realized by any LAN interfaces connectable to a network. It should also be noted that the information terminal-"a" 121 and the information terminal-"b" 123 may be realized by a telephone set, a facsimile (FAX), a television telephone, a personal computer, and the like.

Also, the Internet connection network 122 may be realized by an integrated digital communication network such as an ISDN, an international public network, a cable modem network, a DSL modem network, an FTTH, or an intranet network which is independently constituted within an enterprise. In other words, if the information terminal-"b" 123 may be merely connected to the Internet, then any connection network may be employed. Alternatively, the Internet connection network 122 may be realized by any network capable of providing an IP (Internet Protocol) layer in an OSI (Open Systems Interconnection), namely, by such an intranet network which has been independently constructed in an enterprise, or an open type broadband network if these networks are capable of providing the IP layer in the OSI. Furthermore, no specific limitation is made in the physical layer, the data link layer, and the network layer.

In this first embodiment, such an information terminal system may be arranged in which while both voice information and image information are temporarily stored in an internal memory, the voice information and the image information are arbitrarily transmitted. Alternatively, another information terminal system may be arranged in which while both voice information and image information are stored in a recording apparatus, for example, a hard disk drive, these voice and image information are distributed when a request is made.

Also, in this first embodiment, the image signal is compressed in the image input apparatus 103. Alternatively, the image signal may be compressed by utilizing software of the controller 102, or other signal compressing methods. Similarly, the compression of the voice signal is not limited only to the above arrangement of the voice input apparatus 107.

It should also be understood that although the voice-added information terminal 100 is connected via the gateway 120 to the Internet connection network 122 in this first embodiment, the present invention is not limited thereto. Alternatively, the voice-added information terminal 100 may be directly connected to the Internet connection network 122. Also, the voice-added information terminal 100 may contain the function of the gateway 120 in order to be connected to the information terminal-"a" 121.

Second Embodiment

Figure 2:
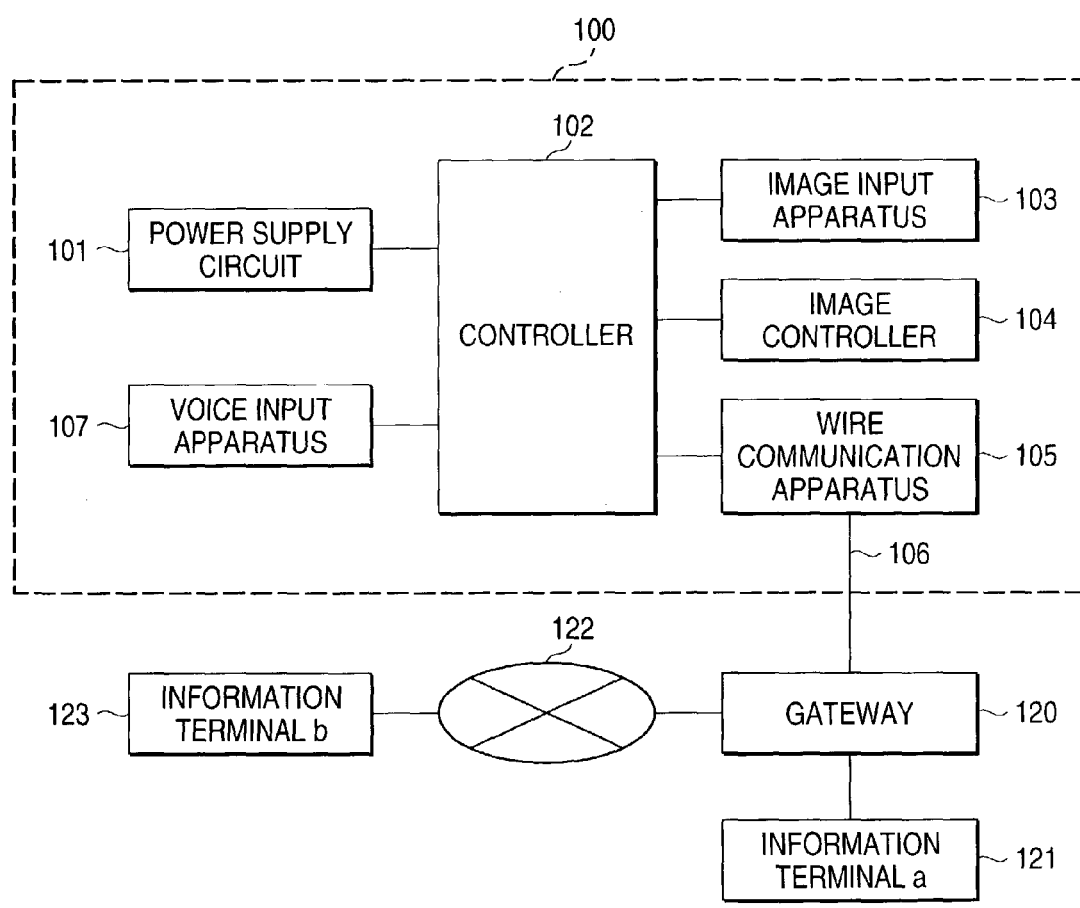
FIG. 2 is a block diagram for schematically indicating a voice-added information terminal and an information terminal system according to a second embodiment of the present invention.

FIG. 2 is a block diagram for schematically indicating both a voice-added information terminal 100 and an information terminal system, according to a second embodiment of the present invention. It should be noted that the same reference numerals shown in the first embodiment of FIG. 1 will be employed as those for denoting the same, or similar units in FIG. 2, and explanations thereof are omitted. Reference numeral 104 shows an image controller capable of changing a position of a camera employed in an image input apparatus 103. For example, this image controller 104 may enlarge and/or compress an image, and also, may move the camera along lateral/longitudinal directions, or right/left directions. When the camera is moved along either the lateral/longitudinal directions or the right/left directions, the image controller 104 sends a camera move signal to a controller 102, and thus, this controller 102 ceases a data processing operation with respect to voice data in accordance with this camera move signal.

When the image controller 104 moves the camera, noise may be sometimes produced in connection with this camera movement. However, as explained above, since this information terminal system of the second embodiment is arranged in such a manner that the controller 102 does not output the voice data while the camera is moved, both the information terminal-"a" 121 and the information terminal-"b" 123 can reproduce noiseless voice signals. It should also be noted that user may select as to whether or not the process operation with respect to the voice data in accordance with the camera move signal.

Referring now to FIG. 2, operations of this voice-added information terminal 100 and the information terminal system, according to the second embodiment, will be explained. In the image input apparatus 103, image information and the like are acquired by the camera and the like, the acquired analog picture (image) signal is compressed into digital picture data based upon requirements of, for example, the JPEG format and the resolution of 640×480, and then, the compressed digital picture data is transmitted to the controller 102 in the transmission rate of 7.5 fps. Also in the voice input apparatus 107, analog voice information is acquired by the microphone and the like, this acquired analog voice information is compressed by using, for example, the voice compressing system of G. 726 so as to produce compressed digital voice data, and then, this compressed digital voice data is transmitted to the controller 102 in the data transmission rate of 32 Kbps (kilobits per second).

In the controller 102, both the digital picture data transmitted from the picture input apparatus 103 and the digital voice data transmitted from the voice input apparatus 107 are obtained, and the digital picture data is multiplexed with the digital voice data, and then, the multiplexed data is sent to the wire communication apparatus 105. The multiplexed data transmitted from the wire communication apparatus 105 is received via the communication cable 106 and the gateway 120 by the information terminal-"a" 121, so that images can be displayed on a display device (not shown) thereof and voice can be reproduced by a speaker (not shown) thereof.

Then, in the case that a direction and a size (dimension) of an image is changed in the information terminal-"a" 121, setting position data corresponding to these direction/size to be changed is transmitted from this information-"a" 121. The transmitted setting position data is received via the gateway 120 and the communication cable 106 by the wire communication apparatus 105, and then, is supplied through the controller 102 to the image controller 104, so that the camera can be moved by driving the image controller 104.

Even when this image controller 104 is driven, analog voice information captured by the microphone of the voice input apparatus 107 is acquired, and this analog voice information is compressed into digital voice data by the voice input apparatus 107, and then, this compressed digital voice data is transmitted to the controller 102 in the data transmission rate of 32 Kbps. As a result, noise produced by moving the camera is captured by the microphone, and this noise is also mixed into the digital voice data.

However, when the image controller 104 is driven, the controller 102 does not employ this voice signal, but employs noiseless voice data, namely non-voice data. Then, the controller 102 multiplexes the non-voice data with the digital picture data supplied from the image input apparatus 103, and then, transmits this multiplexed digital data to the wire communication apparatus 105.

Even when such a noise is produced by moving the camera, the non-voice data is transmitted from the wire communication apparatus 105 at this time, and then, is received via the communication cable 106 and the gateway 120 by the information terminal-"a" 121, so that an image can be displayed on the display device and voice having no noise can be reproduced by the speaker in this information terminal-"a" 121.

Also, a similar operation to the above-explained operation can be realized via the gateway 120 and the Internet connection network 122 by the information terminal-"b" 123, so that an image can be displayed on the display device and voice having no noise can be reproduced by the speaker in this information terminal-"b" 123.

It should also be noted that the image controller 104 may be arranged in such a manner that either the enlargement or the compression of the image, and either the lateral/longitudinal direction or the right/left direction of the camera position movement may be selected based upon use purpose.

In this case, the controller 102 may be arranged by that a music signal and the like is transmitted instead of such a transmission of the voice signal containing the noise produced by the camera movement. Alternatively, this data which is wanted to be transmitted may be set by manipulating an external information terminal.

As previously explained, in accordance with this second embodiment, in the case that the image controller 104 is operated, even when the noise is produced by moving the camera, since the controller 102 is arranged in such a manner that this controller 102 can be set not to transmit the voice data containing the noise with respect to the voice data acquired by the voice input apparatus 107, the noiseless voice signals can be reproduced by the information terminal-"a" 121 and the information terminal-"b" 123.

Also, since the transmission sequence of the voice data and the image data is selectively determined in response to the resolution of the image data, the voice compression system of the voice data, and the communication condition/communication speed of the communication line network, the image can be synchronized with the voice.

It should be understood that the LAN interface with respect to the voice-added information terminal 100, the gateway 120, and the information terminal-"a" 121 is not limited as the physical layer only to the Ethernet, a telephone line, an optical fiber, a coaxial cable, and a power line, but may be realized by any LAN interfaces connectable to a network.

It should also be noted that the information terminal-"a" 121 and the information terminal-"b" 123 may be realized by a telephone set, a facsimile (FAX), a television telephone, a personal computer, and the like. Also, the Internet connection network 122 may be realized by an integrated digital communication network such as an ISDN, an international public network, a cable modem network, a DSL modem network, an FTTH, or an intranet network which is independently constituted within an enterprise. In other words, if the information terminal -"b" 123 may be merely connected to the Internet, then any connection network may be employed. Alternatively, the Internet connection network 122 may be realized by any network capable of providing an IP (Internet Protocol) layer in an OSI (Open Systems Interconnection), namely, by such an intranet network which has been independently constructed in an enterprise, or an open type broadband network if these networks are capable of providing the IP layer in the OSI. Furthermore, no specific limitation is made in the physical layer, the data link layer, and the network layer.

In this second embodiment, such an information terminal system may be arranged in which while both voice information and image information are temporarily stored in an internal memory, the voice information and the image information are arbitrarily transmitted. Alternatively, another information terminal system maybe arranged in which while both voice information and image information are stored in a recording apparatus for example, a hard disk drive, these voice and image information are distributed when a request is made.

Also, in this second embodiment, the image signal is compressed in the image input apparatus 103. Alternatively, the image signal may be compressed by utilizing software of the controller 102, or other signal compressing methods. Similarly, the compression of the voice signal is not limited only to the above arrangement of the voice input apparatus 107.

It should also be understood that although the voice-added information terminal 100 is connected via the gateway 120 to the Internet connection network 122 in this second embodiment, the present invention is not limited thereto. Alternatively, the voice-added information terminal 100 may be directly to the Internet connection network 122. Also, the voice-added information terminal 100 may contain the function of the gateway 120 in order to be connected to the information terminal-"a" 121.

Third Embodiment

Figure 3:
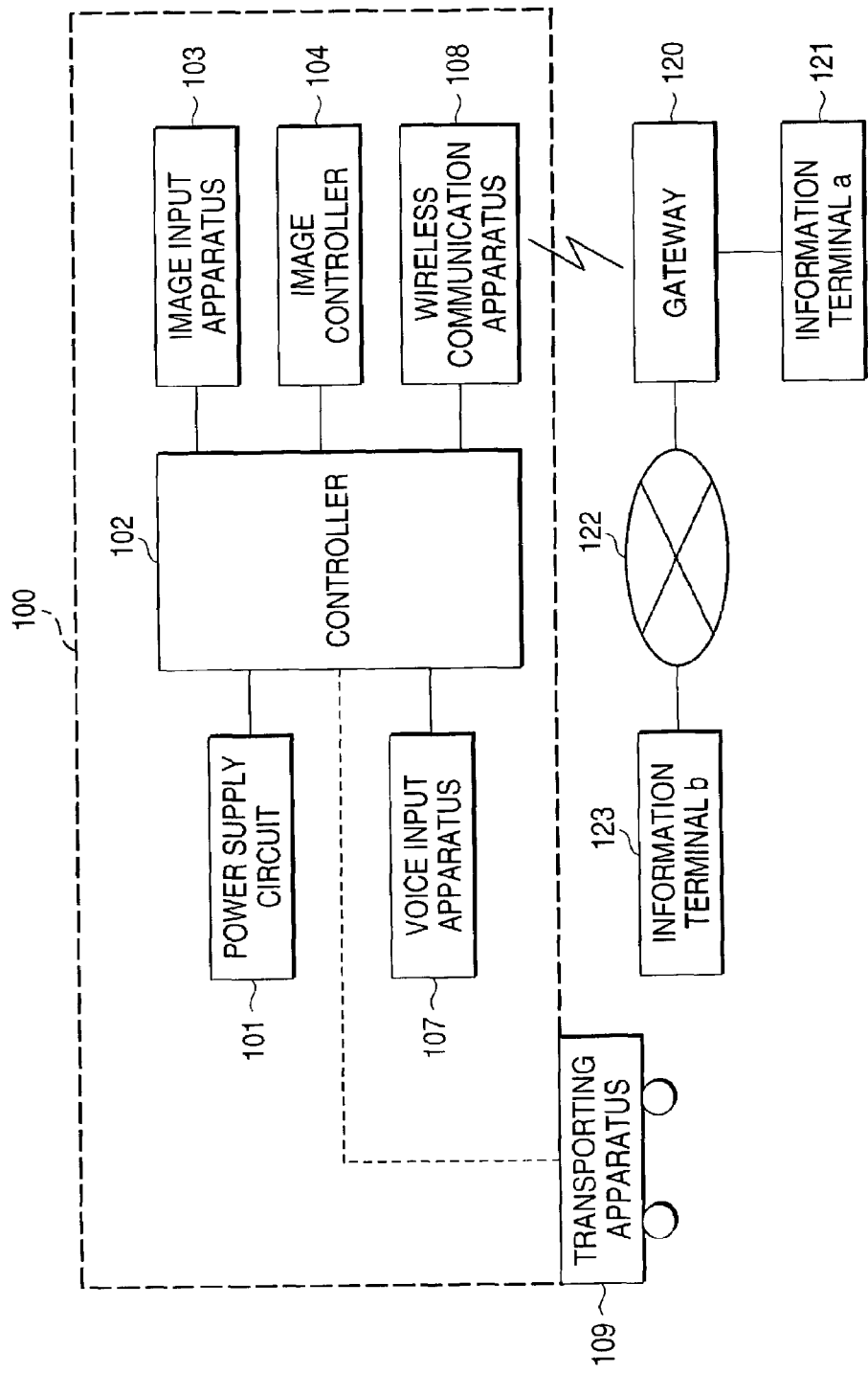
FIG. 3 is a block diagram for schematically representing a voice-added information terminal and an information terminal system according to a third embodiment of the present invention.

FIG. 3 is a block diagram for schematically indicating both a voice-added information terminal 100 and an information terminal system, according to a third embodiment of the present invention. It should be noted that the same reference numerals shown in the first and second embodiments of FIG. 1 and FIG. 2 will be employed as those for denoting the same, or similar units in FIG. 3, and explanations thereof are omitted. Reference numeral 108 shows a wireless communication apparatus. This wireless communication apparatus 108 transmits and receives both voice data and image data via a wireless network. Reference numeral 109 indicates a transporting apparatus for transporting the voice-added information terminal 100. Since this transporting apparatus 109 transports the voice-added information terminal 100 to an arbitrary place, more precise image information and voice information may be acquired. In the case that the transporting apparatus 109 is operated so as to transport the voice-added information terminal 100, the transporting apparatus 109 sends a terminal transport signal to the controller 102, and then this controller 102 ceases a process operation with respect to voice data in response to this terminal transport signal.

When the transporting apparatus 109 is operated, there are some cases that noise may be produced by, for example, rotating a motor. As previously explained, since the voice-added information terminal 100 is arranged in such a manner that the controller 102 does not output the voice data while the transporting apparatus is operated, voice signals having no noise can be reproduced in the information terminal-"a" 121 and the information terminal-"b" 123. It should also be noted that a user may select as to whether or not the process operation with respect to the voice data in accordance with the terminal transport signal.

Referring now to FIG. 3, operations of this voice-added information terminal 100 and the information terminal system, according to the third embodiment, will be explained. In the image input apparatus 103, image information and the like are acquired by the camera and the like, the acquired analog picture (image) signal is compressed into digital picture data based upon requirements of, for example, the JPEG format and the resolution of 640×480, and then, the compressed digital picture data is transmitted to the controller 102 in the data transmission rate of 7.5 fps. Also in the voice input apparatus 107, analog voice information is acquired by the microphone and the like, this acquired analog voice information is compressed by using, for example, the voice compressing system of G. 726 so as to produce compressed digital voice data, and then, this compressed digital voice data is transmitted to the controller 102 in the data transmission rate of 32 Kbps (kilobits per second).

In the controller 102, both the digital picture data transmitted from the picture input apparatus 103 and the digital voice data transmitted from the voice input apparatus 107 are obtained, and the digital picture data is mixed with the digital audio data, and then, the mixed data is sent to the wireless communication apparatus 108. This mixed digital data is received by the information terminal-"a" 121 via the gateway 120 capable of receiving wireless data, so that images can be displayed on the display device thereof and voice can be reproduced by the speaker thereof in this information terminal-"a" 121.

Then, in such a case that a position of the voice-added information terminal 100 is changed, and both a direction and a size (dimension) of an image viewed on the information terminal-"a" 121 are changed, transport position data corresponding to these changes is sent from the information terminal-"a" 121. The sent transport position data is received via the gateway 120 by the wireless communication apparatus 108, and both the image controller 104 and the transporting apparatus 109 are driven via the controller 102, so that the voice-added information terminal 100 can be transported.

When both this image controller 104 and the transporting apparatus 109 are driven, noise caused by this transportation is produced, and then, this noise is captured by the microphone of the voice input apparatus 107, so that this noise may also be mixed into the digital voice data. However, when the transporting apparatus 109 is driven, the controller 102 does not employ this voice signal, but employs noiseless voice data, namely on-voice data. Then, the controller 102 multiplexes the non-voice data with the digital picture data supplied from the image input apparatus 103, and then, transmits this multiplexed digital data to the wire communication apparatus 105.

As previously explained, even when the noise is produced by transporting the voice-added information terminal 100, the digital picture data derived from the image input apparatus 103 is mixed with the non-voice data, and then, the mixed digital picture data is transmitted to the wireless communication apparatus 108. This mixed digital picture data is received via the gateway 120 by the information terminal-"a" 121, so that an image can be displayed on the display device and voice having no noise can be reproduced by the speaker in the information terminal-"a" 121.

Also, a similar operation to the above-explained operation can be realized via the gateway 120 and the Internet connection network 122 by the information terminal-"b" 123, so that an image can be displayed on the display device and voice having no noise can be reproduced by the speaker in this information terminal-"b" 123.

It should also be noted that the image controller 104 may be arranged in such a manner that either the enlargement or the compression of the image, and either the lateral/longitudinal direction or the right/left direction of the camera position movement may be selected based upon use purpose. Alternatively, both the image controller 104 and the transporting apparatus 109 may be selectively arranged in an alternative information terminal system. Furthermore, this transport apparatus 109 may be arranged in such a manner that at least one of plane movement and vertical movement may be realized.

In this case, the controller 102 may be arranged by that a music signal and the like is transmitted instead of such a transmission of the voice signal containing the noise produced by the camera movement. Alternatively, this data which is wanted to be transmitted may be set by manipulating an external information terminal.

As previously explained, in accordance with this third embodiment, since both the image controller 104 and the transporting apparatus 109 can be transported along the lateral/longitudinal directions, or the right/left directions and also can be operated in either the enlarging mode or the compressing mode, desirable image information can be acquired. Moreover, even if noise is produced when both the image controller 104 and the transporting apparatus are operated, since the controller 102 is arranged in such a manner that this controller 102 can be set not to transmit the voice data containing the noise with respect to the voice data, the noise-less voice signals can be reproduced by the information terminal-"a" 121 and the information terminal-"b" 123.

In this case, since the transmission sequence of the voice data and the image data is selectively determined in response to the resolution of the image data, the voice compression system of the voice data, and the communication condition/communication speed of the communication line network, the image can be synchronized with the voice.

It should be understood that the LAN interface with respect to the voice-added information terminal 100, the gateway 120, and the information terminal-"a" 121 is not limited as the physical layer only to the Ethernet, a telephone line, an optical fiber, a coaxial cable, and a power line, but may be realized by any LAN interfaces connectable to a network.

It should also be noted that the information terminal-"a" 121 and the information terminal-"b" 123 may be realized by a telephone set, a facsimile (FAX), a television telephone, a personal computer, and the like. Also, the Internet connection network 122 may be realized by an integrated digital communication network such as an ISDN, an international public network, a cable modem network, a DSL modem network, an FTTH, or an intranet network which is independently constituted within an enterprise. In other words, if the information terminal-"b" 123 may be merely connected to the Internet, then any connection network may be employed. Alternatively, the Internet connection network 122 may be realized by any network capable of providing an IP (Internet Protocol) layer in an OSI (Open Systems Interconnection), namely, by such an intranet network which has been independently constructed in an enterprise, or an open type broadband network if these networks are capable of providing the IP layer in the OSI. Furthermore, no specific limitation is made in the physical layer, the data link layer, and the network layer.

In this third embodiment, such an information terminal system may be arranged in which while both voice information and image information are temporarily stored in an internal memory, the voice information and the image information are arbitrarily transmitted. Alternatively, another information terminal system may be arranged in which while both voice information and image information are stored in a recording apparatus, for example, a hard disk drive, these voice and image information are distributed when a request is made.

Also, in this third embodiment, the image signal is compressed in the image input apparatus 103. Alternatively, the image signal may be compressed by utilizing software of the controller 102, or other signal compressing methods. Similarly, the compression of the voice signal is not limited only to the above arrangement of the voice input apparatus 107.

It should also be understood that although the voice-added information terminal 100 is connected via the gateway 120 to the Internet connection network 122 in this third embodiment, the present invention is not limited thereto. Alternatively, the voice-added information terminal 100 may be directly to the Internet connection network 122. Also, the voice-added information terminal 100 may contain the function of the gateway 120 in order to be connected to the information terminal-"a" 121.

Fourth Embodiment

Figure 4:
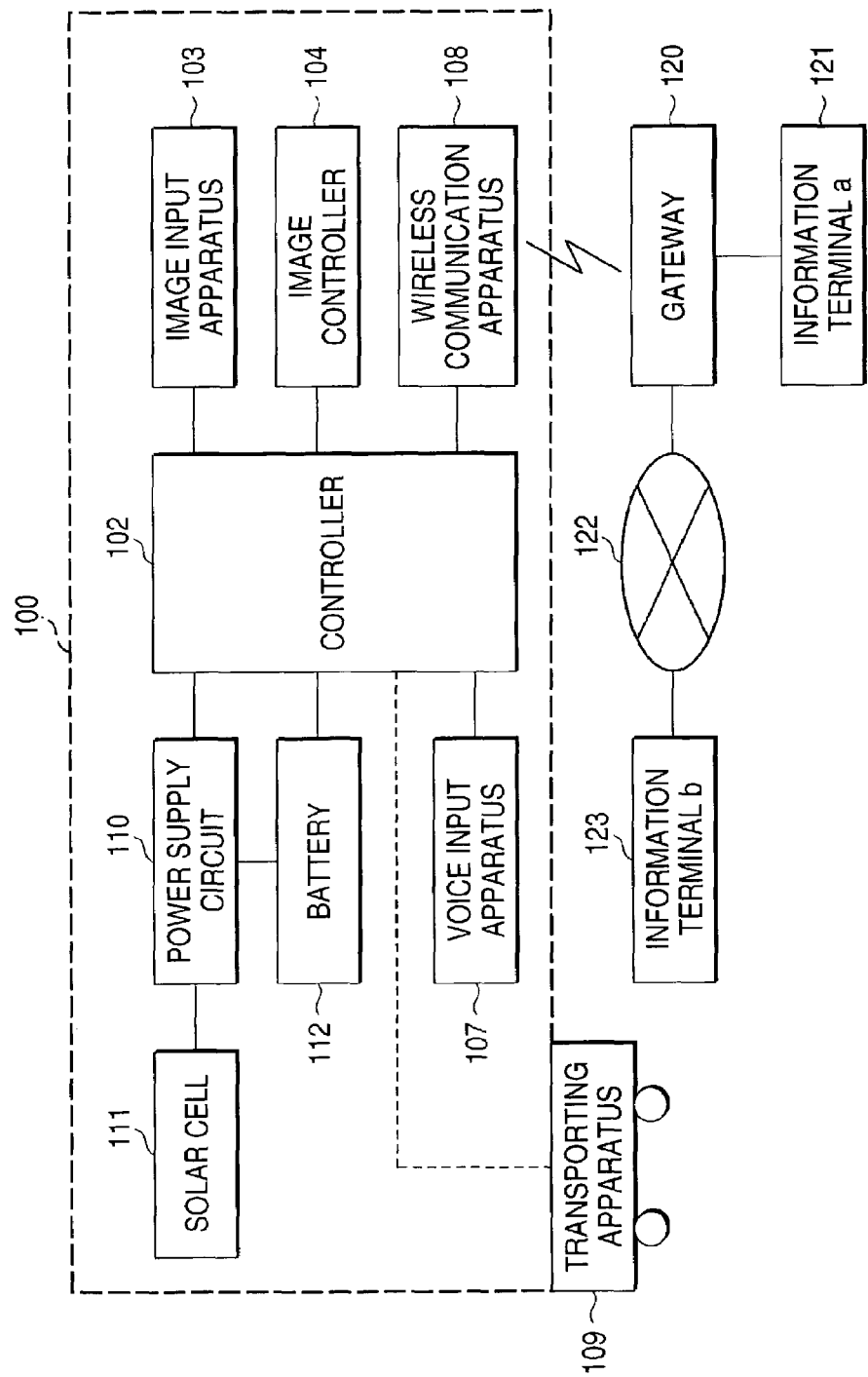
FIG. 4 is a block diagram for schematically showing a voice-added information terminal and an information terminal system according to a fourth embodiment of the present invention.

FIG. 4 is a block diagram for schematically indicating both a voice-added information terminal 100 and an information terminal system, according to a fourth embodiment of the present invention. It should be noted that the same reference numerals shown in the first, second, and third embodiments of FIG. 1, FIG. 2, and FIG. 3 will be employed as those for denoting the same, or similar units in FIG. 4, and explanations thereof are omitted. Reference numeral 110 shows a power supply unit, reference numeral 111 indicates a solar cell, and reference numeral 112 represents a battery. A supply of electric power to the voice-added information terminal 100 is carried out as follows. That is, electric power generated from the solar cell 111 is charged via the power supply unit 110 into the battery 112, and also, partial electric power of this generated electric power is converted via the power supply unit 110 into stable electric power, and thereafter, this stable electric power is supplied to the respective units. Also, in the case that power generations of the solar cell 111 cannot be performed due to night hours and rain, the electric power which has been stored in the battery is supplied to the respective units, so that stable electric power may be supplied. Also, the voice-added information terminal 100 may be transported by a transporting apparatus 109.

As previously described, in accordance with this fourth embodiment, the supply of the electric power to the voice-added information terminal 100 is carried out by the solar cell 111 and the battery 112. Also, the data communication can be carried out by the wireless communication apparatus 108, and also, the voice-added information terminal 100 can be transported by the transporting apparatus 109. Both the cable construction of the power supply and the wiring construction of the signals can be eliminated, and further, while there is no limitation in a transport place, the voice-added information terminal 100 may be transported to an arbitrary place, so that both necessary voice information and necessary image information can be acquired.

It should be noted that in this fourth embodiment, the solar cell is employed so as to supply the electric power of the power source. Alternatively, the supply of electric power may be realized by any arrangement having a similar function. For example, the electric power may be recharged to a battery, or a charged cell may be installed in the voice-added information terminal 100.

It should also be noted that the image controller 104 may be arranged in such a manner that either the enlargement or the compression of the image, and either the lateral/longitudinal direction or the right/left direction of the camera position movement may be selected based upon use purpose. As a consequence, desirable information may be readily acquired. Alternatively, both the image controller 104 and the transporting apparatus 109 may be selectively arranged in an alternative information terminal system. Furthermore, this transport apparatus 109 may be arranged in such a manner that at least one of plane movement and vertical movement may be realized.

In this case, the controller 102 may be arranged by that a music signal and the like is transmitted instead of such a transmission of the voice signal containing the noise produced by the camera movement. Alternatively, this data which is wanted to be transmitted may be set by manipulating an external information terminal.

It should be understood that the LAN interface with respect to the voice-added information terminal 100, the gateway 120, and the information terminal-"a" 121 is not limited as the physical layer only to the Ethernet, a telephone line, an optical fiber, a coaxial cable, and a power line, but may be realized by any LAN interfaces connectable to a network.

It should also be noted that the information terminal-"a" 121 and the information terminal-"b" 123 may be realized by a telephone set, a facsimile (FAX), a television telephone, a personal computer, and the like. Also, the Internet connection network 122 may be realized by an integrated digital communication network such as an ISDN, an international public network, a cable modem network, a DSL modem network, an FTTH, or an intranet network which is independently constituted within an enterprise. In other words, if the information terminal -"b" 123 may be merely connected to the Internet, then any connection network may be employed. Alternatively, the Internet connection network 122 may be realized by any network capable of providing an IP (Internet Protocol) layer in an OSI (Open Systems Interconnection), namely, by such an intranet network which has been independently constructed in an enterprise, or an open type broadband network if these networks are capable of providing the IP layer in the OSI. Furthermore, no specific limitation is made in the physical layer, the data link layer, and the network layer.

In this fourth embodiment, such an information terminal system may be arranged in which while both voice information and image information are temporarily stored in an internal memory, the voice information and the image information are arbitrarily transmitted. Alternatively, another information terminal system may be arranged in which while both voice information and image information are stored in a recording apparatus, for example, a hard disk drive, these voice and image information are distributed when a request is made.

Also, in this fourth embodiment, the image signal is compressed in the image input apparatus 103. Alternatively, the image signal may be compressed by utilizing software of the controller 102, or other signal compressing methods. Similarly, the compression of the voice signal is not limited only to the above arrangement of the voice input apparatus 107.

It should also be understood that although the voice-added information terminal 100 is connected via the gateway 120 to the Internet connection network 122 in this fourth embodiment, the present invention is not limited thereto. Alternatively, the voice-added information terminal 100 may be directly to the Internet connection network 122. Also, the voice-added information terminal 100 may contain the function of the gateway 120 in order to be connected to the information terminal-"a" 121.

Fifth Embodiment

Figure 5:
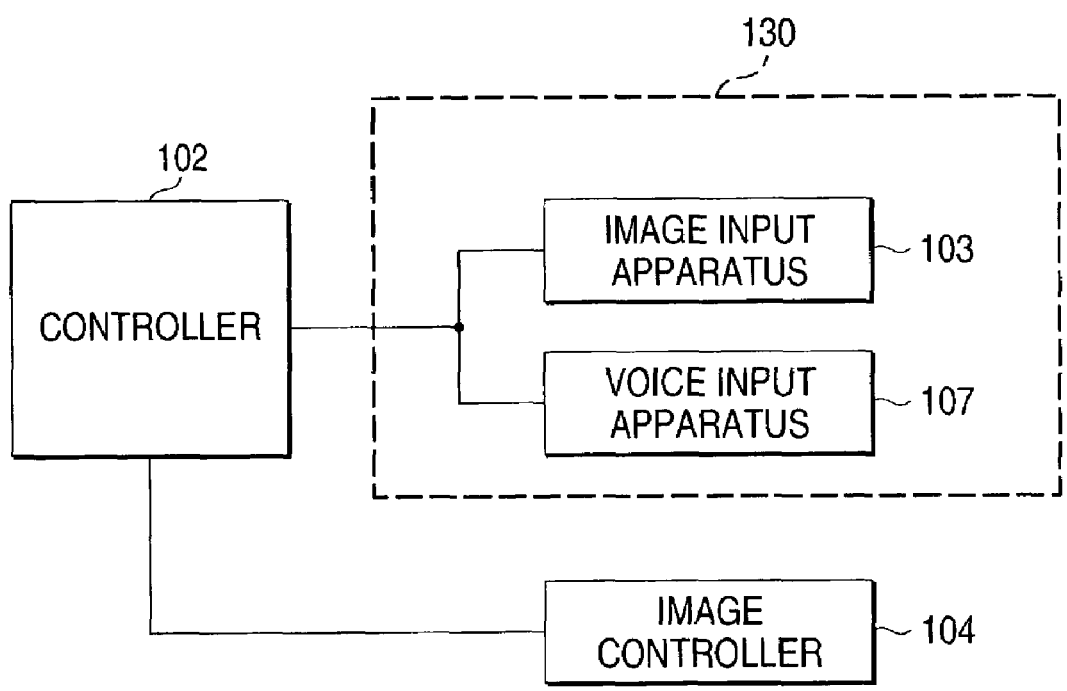
FIG. 5 is a block diagram for schematically showing a voice-added information terminal and an information terminal system according to a fifth embodiment of the present invention.
Figure 6:
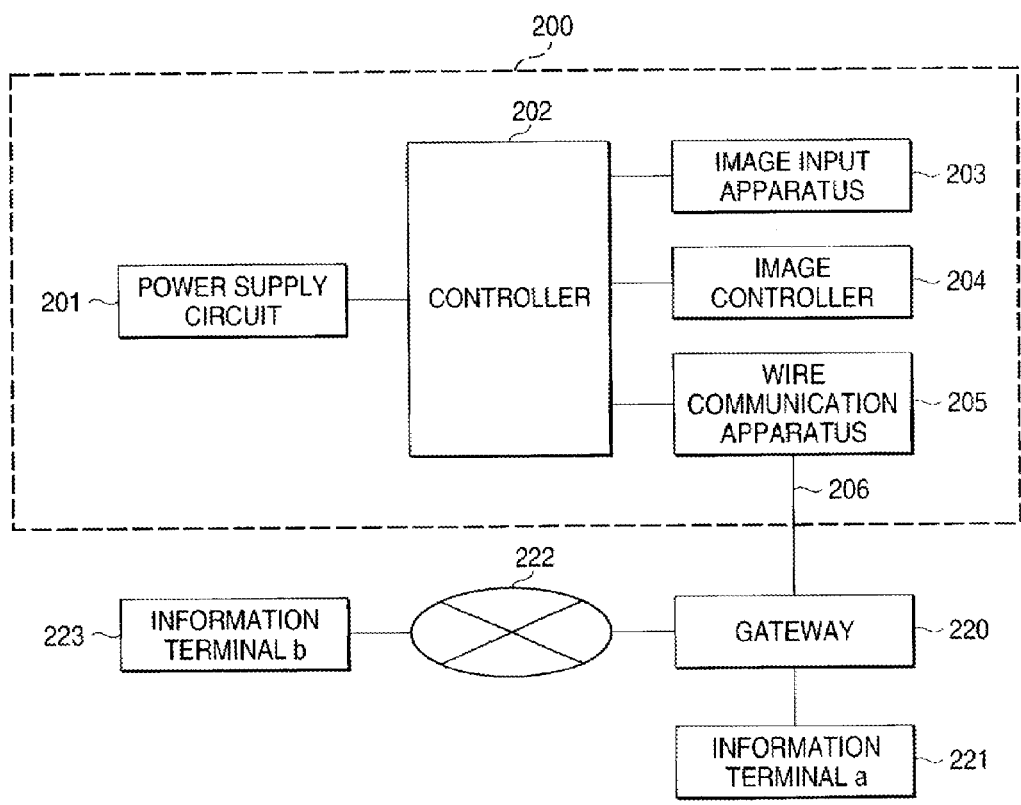
FIG. 6 is a block diagram for schematically indicating the conventional image terminal and the conventional information communication system.

FIG. 5 is a block diagram for schematically indicating an input apparatus of a voice-added information terminal according to a fifth embodiment of the present invention. It should be noted that both an image input apparatus 103 and a voice input apparatus 107 correspond to an input apparatus 130 which constitutes the voice-added information terminals 100 shown in FIG. 1, FIG. 2, FIG. 3, and FIG. 4. In this case, this input apparatus 130 corresponds to such an input apparatus that both the image input apparatus 103 and the voice input apparatus 107 are formed in an integral manner, or are transported in a similar manner. Also, an image controller and a controller correspond to the image controller 104 and the controller 102, which constitute the voice-added information terminals 100 of FIG. 1, FIG. 2, FIG. 3, and FIG. 4.

In FIG. 5, reference numeral 103 shows an image input apparatus. This input apparatus 103 inputs therein to an image signal by operating a camera, or the like, converts the input image signal into digital image data, and then, outputs this digital image data. Reference numeral 107 indicates a voice input apparatus. The voice input apparatus 107 inputs therein to a voice signal by operating a microphone, or the like, converts this input voice signal into digital voice data, and then, outputs this digital voice data.

Since the image controller 104 is driven by receiving an instruction of changing a direction of an image and of changing a size (dimension) of the image, the input apparatus 130 is transported. Since both the image input apparatus 103 and the voice input apparatus 107 employed in the input apparatus 130 are moved to similar positions, both a desirable image and voice having no directivity can be acquired.

In the above-described first to fifth embodiments, a security function is entered so as to transmit/receive information with respect to information terminals. For example, while specific keys used to acquire information between both the information terminals are set, when the key sent from one information terminal is made coincident with the key of the other information terminal, the information of the other information terminal can be acquired.

On the other hand, since such a system capable of managing charge amounts in accordance with communication line use fees, or capable of managing advertisement fees is established in order to transmit/receive information between information terminals and an upper-grade system (for example, information distribution server), such a system can be established by which expenses can be shared to users and information distributors and also can be managed.

Also, such a system capable of synthesizing image information with voice information may be constructed by arranging that after an image controlling operation of an image controller has been accomplished, both transmission timing of the image information and transmission timing of the voice information are initiated by a controller.

It should also be noted that in accordance with the present invention, interfaces of gateways are not limited to those of the above-explained first to fifth embodiments, but also the present invention does not define sorts and a total number of physical layers of interfaces.

As apparent from the foregoing descriptions, a voice output apparatus such as a speaker may be additionally provided with a voice-added information terminal, so that communications may be established in dual direction. Furthermore, a system may be realized by a portable telephone network and the like so as to transmit/receive data, and this system may be added.

In this fifth embodiment, it is possible to select as to whether or not voice data containing noise caused by transporting the input apparatus 130 is employed. In the case that this voice data containing the noise is not selected, such a system capable of also acquiring the voice data may also be operated while the input apparatus 130 is transported.

What is claimed is:

1. An information terminal comprising:
  a). an image input apparatus equipped with a camera for performing a photographing operation;
  b). a voice input apparatus for inputting voice;
  c). an information communication apparatus for transmitting information;
  d). an image controller for switching camera positions in order to change a photographing range; and
  e). a controller for outputting both image information acquired by said image input apparatus and voice information acquired by said voice input apparatus to said information communication apparatus; wherein:
  f). said controller always stops outputting the voice information the entire time during which said image controller switches the camera positions, in any range in which the camera is capable of moving.

2. An information terminal as recited in claim 1 wherein:
said image controller executes at least one of enlarging operation, compressing operation, movement of lateral/longitudinal directions, and movement of right/left directions.

3. An information terminal as recited in claim 1 wherein:
the input information of said image input apparatus corresponds to an image.

4. An information terminal as recited in claim 1 wherein:
said information terminal further comprises a power supply unit without a power supply cord;
said information communication apparatus is a wireless communication apparatus for transmitting/receiving data in a wireless manner; and
said controller outputs both the image information acquired by said image input apparatus and the voice information acquired by said voice input apparatus to said wireless communication apparatus.

* * * * *